United States Patent [19]

Itoh et al.

[11] Patent Number: 4,666,254

[45] Date of Patent: May 19, 1987

[54] LIQUID CRYSTAL DISPLAY PANEL WITH A METAL PLATE IN ITS TERMINAL PORTION

[75] Inventors: Yoshiro Itoh, Yamatokoriyama; Yoshinori Oogita, Nara; Shigeki Komaki, Nara; Kazuhiro Nakao, Nara, all of Japan

[73] Assignee: Sharp Kabushiki Kaisha, Osaka, Japan

[21] Appl. No.: 695,288

[22] Filed: Jan. 28, 1985

[30] Foreign Application Priority Data

Jan. 30, 1984 [JP] Japan .................. 59-16765

[51] Int. Cl.$^4$ ................................. G02F 1/13
[52] U.S. Cl. .................................... 350/334
[58] Field of Search .............. 350/338, 337, 331 R, 350/334; 340/784, 765

[56] References Cited

U.S. PATENT DOCUMENTS

| 4,469,410 | 9/1984 | Ikesue | 350/343 |
| 4,515,440 | 5/1985 | Mosier | 350/334 |
| 4,561,724 | 12/1985 | Otaki et al. | 350/334 |

Primary Examiner—L. T. Hix
Assistant Examiner—Brian W. Brown
Attorney, Agent, or Firm—Birch, Stewart, Kolasch & Birch

[57] ABSTRACT

A liquid crystal display panel to electrically and mechanically be connected to a substrate of an electronic apparatus comprises a liquid crystal display, a terminal connection member, and a metal plate such as a stainless. The terminal connection member is provided for electrically and mechanically coupling the liquid crystal display with the substrate of the electronic apparatus at a terminal connection portion. The metal plate is positioned at the terminal connection portion to shield a hard and fragile substrate of the liquid crystal display.

22 Claims, 5 Drawing Figures

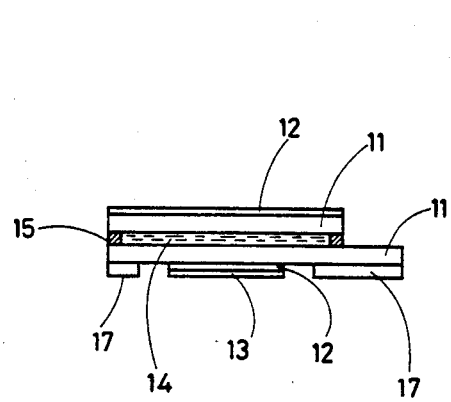
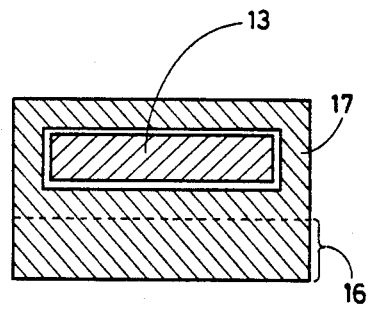
FIG.1 (1)            FIG.1 (2)
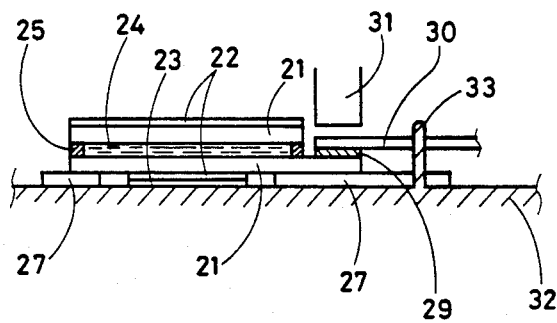
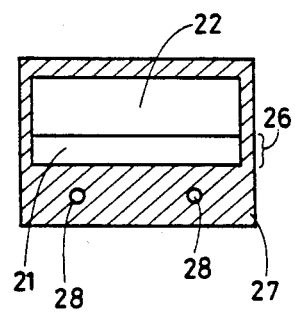
FIG. 2 (1)           FIG. 2 (2)
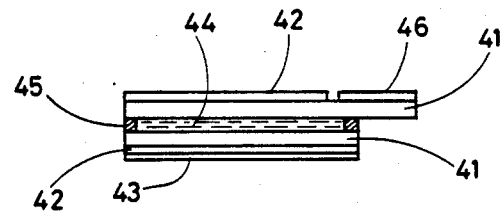
FIG. 3

LIQUID CRYSTAL DISPLAY PANEL WITH A METAL PLATE IN ITS TERMINAL PORTION

BACKGROUND OF THE INVENTION

The present invention relates to a liquid crystal display panel and, more particularly, to the construction of a liquid crystal display panel with a metal plate reinforcing a terminal portion on a substrate of the liquid crystal display panel.

A very thin glass, typically, about 0.1 mm, should be used to construct a liquid crystal display panel. In oder that a very thin terminal is provided between the liquid crystal display panel and a substrate of an electronic apparatus, an anisotropically-conductive adhesive is used. For the adhesive to attain a sufficient connection force and reliability for connecting the liquid crystal display panel to the substrate of an electronic apparatus, a heater head should be applied at the terminal. Some elements of the conventional liquid crystal display panel such as a reflector and a polarizer cannot withstand the heat and force provided by the heater head, and may deform and the terminal glass may crack due to application of the heater head due to thermal shock.

SUMMARY OF THE INVENTION

Accordingly, it is an object of the present invention to provide an improved liquid crystal display panel which is very thin and strong.

It is another object of the present invention to provide an improved construction of a liquid crystal display panel in which a metal plate such as a stainless steel one is positioned at a terminal portion of the liquid crystal display panel in place of a reflector and a polarizer.

It is a further object of the present invention to provide an improved construction of a liquid crystal display panel with an anisotropically-conductive adhesive applied at a terminal portion of the liquid crystal display panel and to provide a thin hard and fragile substrate such as a glass plate at the connection terminal with a metal plate such as a stainless steel plate.

It is still a further object of the present invention to provide an improved construction of a liquid crystal display panel, that can be electrically and mechanically connected to a substrate of an electronic apparatus, comprising a liquid crystal display means, terminal connection means, and metal plate means such as a stainless steel plate. The terminal connection means is provided for electrically and mechanically coupling the liquid crystal display means with a substrate of an electronic apparatus at a terminal connection portion. The metal plate means is positioned at the terminal connection portion to reinforce a hard and fragile substrate of the liquid crystal display means during connecting the liquid crystal display means to a substrate of an electronic apparatus.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 1(1) and 1(2) are a sectional view and a bottom view of a liquid crystal display panel according to a first preferred embodiment of the present invention, respectively;

FIGS. 2(1) and 2(2) are a sectional view and a bottom view of a liquid crystal display panel according to a second preferred embodiment of the present invention, respectively; and FIG. 3 is a sectional view of a liquid crystal display panel according to a third preferred embodiment of the present invention.

DESCRIPTION OF THE PREFERRED EMBODIMENTS

FIGS. 1(1) and 1(2) are a sectional view and a bottom view of a liquid crystal display panel according to a first preferred embodiment of the present invention.

The liquid crystal display panel of the first preferred embodiment comprises a hard and fragile substrate 11 such as a glass, a polarizer 12, a reflector 13, a liquid crystal material layer 14, a seal 15, and a metal plate 17 such as a stainless steel plate. The metal plate 17 is positioned on a substrate of the liquid crystal display panel. As shown in FIG. 1(2), the reflector 13 is surrounded by the metal plate 17 and the metal plate 17 provides a connection terminal portion 16. The hard and fragile substrate 11 is preferably about 0.1 mm in thickness.

The reflector 13 and the polarizer 12 are adhered to the hard and fragile substrate 11 before connecting the liquid crystal panel with a substrate of an electronic apparatus by means of an adhensive such as an anisotropically-conductive adhensive. A heater head is applied to the liquid crystal display panel and the substrate of the electronic apparatus for connecting them. Probably, the reflector 13 and the polarizer 12 can be adhered after the connection.

According to the feature of the present invention, the polarizer 12 and the reflector 13 are not positioned on the substrate 11 at the terminal connection portion 16 on a substrate of the liquid crystal display panel. Instead, the metal plate 17 occupies the terminal connection portion 16 on the substrate of the liquid crystal display panel. The metal plate 17 can withstand the heat and the force of the heat head without any substantial deformation thereof. Hence, a strong liquid crystal display panel can be constructed. The metal plate 17 can serve to strengthen the liquid crystal display panel when it has been assembled in an electronic apparatus such as a thin electronic calculator, a card-type electronic apparatus equipped with an Integrated Circuit (IC), etc.

FIGS. 2(1) and 2(2) are a sectional view and a bottom view of a liquid crystal display panel according to a second preferred embodiment of the present invention, respectively.

The liquid crystal display panel of the second preferred embodiment comprises a hard and fragile substrate 21 such as a glass plate, a polarizer 22, a reflector 23, a liquid crystal material layer 24, a seal 25, a metal plate 27 such as a stainless steel plate, and an anistotropically-conductive adhesive 29. A substrate 30 is extended from the electronic apparatus for electrically coupling the liquid crystal display panel and the electronic apparatus with wire means thereon.

The anisotropically-conductive adhesive comprises electrically conductive particles such as Ag powder mixed in a non-conductive base at such a mixing ratio that the conductive particles are not in contact with one another. When this adhesive is disposed between the facing electrodes, it provides electric conductivity between the facing electrodes, but maintains electric insulation in the lateral direction.

Preferably, it is made of a material which is electrically insulating and molten under heating with pressure, for example, a thermoplastic resin.

As shown in FIG. 2(2), the polarizer 22 is surrounded by the metal plate 27 having a terminal connection portion 26. A pair of apertures 28 are formed in the metal plate 27. To combine the thus arranged liquid crystal display panel with the substrate 30, a connecting apparatus is operated comprising a heater head 31, a connecting table 32, and a pin 33 projected from the connecting table 32.

In the second preferred embodiment of the present invention, the size of the metal plate 27 is larger than that of the primary portions of the liquid crystal display panel. When the liquid crystal display panel is assembled in an electronic apparatus and other hard materials collide with it, the metal plate 27 can prevent the hard and fragile substrate 21 from being damaged. The pin 33 is inserted into the pair of apertures 28 to accurately position the liquid crystal display panel and the substrate 30.

FIG. 3 is a sectional view of a liquid crystal panel according to a third preferred embodiment of the present invention.

The liquid crystal display panel in the third embodiment comprises a hard and fragile substrate 41 such as a glass, a polarizer 42, a reflector 43, a liquid crystal material layer 44, a seal 45, and a metal plate 46.

In FIG. 3, the polarizer 42 and the reflector 43 are not surrounded by the metal plate 46. They are supported with a different substrate of the liquid crystal display panel. Far from the polarizer 42, metal plate 46 is positioned on the terminal portion on the substrate of the liquid crystal display panel.

While only certain embodiments of the present invention have been described, it will be apparent to those skilled in the art that various changes and modifications may be made therein without departing from the spirit and scope of the present invention as claimed.

What is claimed is:

1. A liquid crystal display panel comprising:
   a first substrate plate;
   a second substrate plate superimposing said first substrate plate with a first side adjacent said first substrate plate, said first side of said second substrate plate having a terminal connector electrode portion wherein display electrodes disposed between said first and second substrate plates have leads that extend to said terminal connector electrode portion;
   sealing means disposed between said first and second substrate plates for providing a sealed volume between said first and second substrate plates;
   liquid crystal composition disposed within said sealed volume;
   a metal plate laminated to a second side of said second substrate plate, said metal plate superimposing said terminal connector electrode portion for increasing the mechanical strength of said second substrate plate at said terminal connector electrode portion; and
   a reflector plate operatively connected to said second side of said second substrate plate, said reflector plate superimposing said display electrodes and being isolated from said metal plate for preventing heat transfer between said metal plate and said reflector plate.

2. The liquid crystal display panel according to claim 1, wherein said second substrate plate extends beyond an edge of said first substrate plate providing an extension of the liquid crystal display panel at which said terminal connector electrode portion is disposed.

3. The liquid crystal display panel according to claim 1, wherein said metal plate is substantially the same size as said second substrate plate, and includes a window superimposed and adjacent said display electrodes and wherein said reflector plate is of a size smaller than said window and is disposed within said window isolated from heat transfer from said metal plate.

4. The liquid crystal display panel according to claim 2, wherein said metal plate is substantially the same size as said second substrate plate, and includes a window superimposed and adjacent said display electrodes and wherein said reflector plate is of a size smaller than said window and is disposed within said window isolated from heat transfer from said metal plate.

5. The liquid crystal display panel according to claim 1, wherein said metal plate is a stainless steel plate.

6. The liquid crystal display panel according to claim 4, wherein said metal plate is a stainless steel plate.

7. The liquid crystal display panel according to claim 1, including a first and second polarizer plate laminated to a respective first and second sides of an assembly comprising said first and second substrate plates, said second polarizer plate being isolated from said metal plate,
   wherein said reflector plate is laminated to said second polarizer plate.

8. The liquid crystal display panel according to claim 6, including a first and second polarizer plate laminated to a respective first and second sides of an assembly comprising said first and second substrate plates, said second plolarizer plate being isolated from said metal plate,
   wherein said reflector plate is laminated to said second polarizer plate.

9. The liquid crystal display panel according to claim 1, wherein said first and second substrate plates comprise a hard fragile material such as glass.

10. The liquid crystal display panel according to claim 8, wherein said first and second substrate plates comprise a hard fragile material such as glass.

11. The liquid crystal display panel according to claim 1, including a layer of anistropically conductive adhesive provided on said terminal connector portion for connecting the liquid crystal display panel to a substrate of an electronic apparatus.

12. The liquid crystal display panel according to claim 10, including a layer of anistropically conductive adhesive provided on said terminal connector portion for connecting the liquid crystal display panel to a substrate of an electronic apparatus.

13. The liquid crystal display panel according to claim 1, wherein said metal plate is provided with a plurality of holes for aligning the liquid crystal display panel with a substrate of an electronic apparatus.

14. A liquid crystal display panel comprising:
   a first substrate plate having a first and second side, said second side of said first substrate plate having a terminal connector electrode portion wherein display electrodes disposed adjacent said second side of said first substrate plate have leads that extend to said terminal connector electrode portion;

a second substrate plate superimposing said first substrate plate, said second substrate plate having a first side adjacent said first substrate plate;

sealing means disposed between said first and second substrate plates for providing a sealed volume between said first and second substrate plates;

liquid crystal composition disposed within said sealed volume;

a metal plate laminated to said first side of said first substrate plate, said metal plate superimposing said terminal connector electrode portion for increasing the mechanical strength of said first substrate plate at said terminal connector electrode portion; and a first polarizer plate laminated to said first side of said first substrate plate, said first polarizer plate superimposing said display electrodes and isolated from said metal plate for preventing heat transfer between said metal plate and said polarizer plate.

15. The liquid crystal display panel according to claim 14, including a second polarizer plate laminated to a second side of said second substrate plate and including a reflector plate laminated to said second polarizer plate.

16. The liquid crystal display panel according to claim 14, wherein said metal plate is a stainless steel plate.

17. The liquid crystal display panel according to claim 15, wherein said metal plate is a stainless steel plate.

18. The liquid crystal display panel according to claim 14, wherein said first and second substrate plates are made from a hard fragile material such as glass.

19. The liquid crystal display panel according to claim 14, wherein said first and second substrate plates are made from a hard fragile material such as glass.

20. The liquid crystal display panel according to claim 14, including a layer of anistropically conductive adhesive provided on said terminal connector portion for connecting the liquid crystal display panel to a substrate to an electronic apparatus.

21. The liquid crystal display panel according to claim 19, including a layer of anistropically conductive adhesive provided on said terminal connector portion for connecting the liquid crystal display panel to a substrate to an electronic apparatus.

22. The liquid crystal display panel according to claim 14, wherein said first substrate plate extends beyond an edge of said second substrate plate providing an extension portion of the liquid crystal display panel at which said terminal connector electrode portion is disposed.

* * * * *